May 17, 1932.  C. ERSKINE  1,858,769
SEMITRAILER MOTOR TRAIN
Filed April 17, 1931
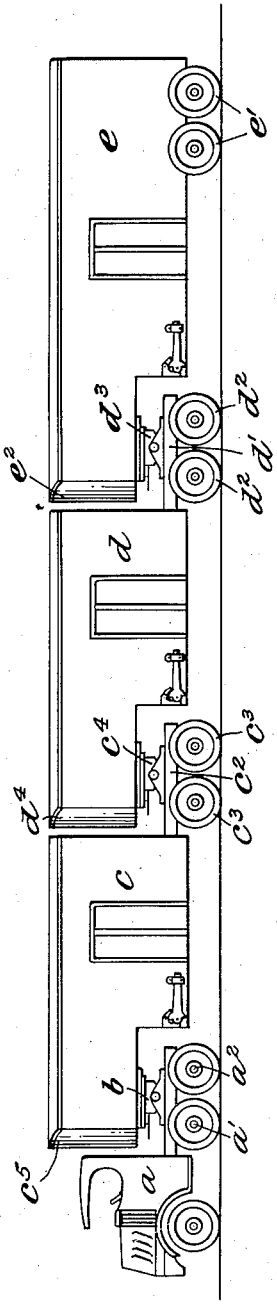
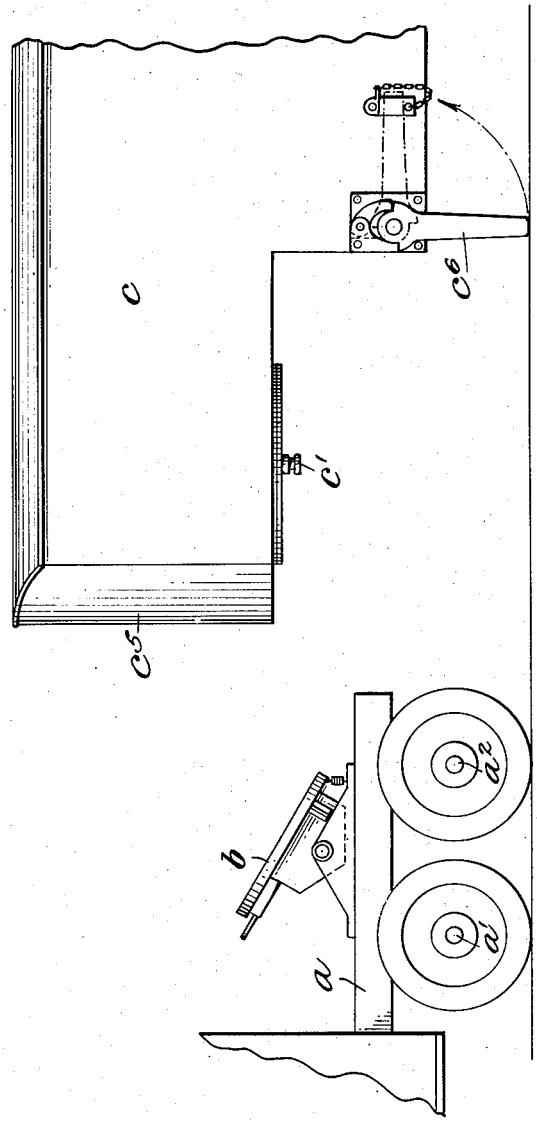
Inventor:
Clyde Erskine
By his Attorneys
Redding, Greeley, O'Shea & Campbell Patented May 17, 1932

1,858,769

UNITED STATES PATENT OFFICE

CLYDE ERSKINE, OF ST. LOUIS, MISSOURI, ASSIGNOR TO INTERNATIONAL MOTOR COMPANY, OF NEW YORK, N. Y., A CORPORATION OF DELAWARE

SEMITRAILER MOTOR TRAIN

Application filed April 17, 1931. Serial No. 530,743.

A tractor semi-trailer unit has certain advantages in automotive transportation. It is not unusual now to attach to a tractor semi-trailer unit a four wheel trailer. Thus the power plant is enabled to move two load carrying bodies. In some instances a conventional trailer is employed and in some instances a "dolly" is provided to support the front end of a semi-trailer thereby converting it into the equivalent of a trailer. In either case the trailer is connected to the rear end of the semi-trailer by means of a draw bar. This practice has several distinct disadvantages. The present invention seeks to provide a motor train made up of a plurality of semi-trailers in which for a given overall length a greater pay-load can be transported with a single tractor. For the best understanding of the invention it may be considered that three units will be employed to constitute the train as compared to two units now employed under the existing practice as described above. By the use of three units each one may be of relatively lighter construction since it need carry a relatively lighter load, the result being that the pay-load carried thereby is relatively greater and the aggregate pay-load of the three units is substantially greater than the aggregate pay-load of the two units commonly employed as described. Further, in accordance with the invention semi-trailers are used to the exclusion of a semi-trailer and trailer combination thereby avoiding the use of a draw bar with its known disadvantages. By the use of semi-trailers the overall length of the train is readily kept within permissible limits and the center of gravity for each unit may be kept lower. Further, since a semi-trailer is itself coupled to a semi-trailer the use of a "dolly" for any purpose is avoided, as is desirable. It has been found in practice that for a motor train made in accordance with the present invention using three units, approximately twenty-five (25) tons can be transported where the train is of a given overall length, and with legal axle loads, as against a pay-load of approximately eighteen (18) tons for a motor train of the same overall length made up of two units comprising a semi-trailer and a trailer.

Another object of the invention is to provide semi-trailers of improved construction which shall permit the closest possible coupling and the turning of the train on a small radius without interference. This abject is best accomplished by forming the front end of each semi-trailer of curved configuration so that it may be brought in close juxtaposition to the rear end of the previous semi-trailer to which it is coupled, the curved form permitting free turning of one unit with respect to another without interference.

These and other advantages will appear fully in connection with the description of the embodiment shown in the accompanying drawings, in which:

Figure 1 is a view in side elevation of a motor train made in accordance with the invention, each unit being shown with two axles, although it will be evident that single axles might be employed.

Figure 2 is a fragmentary view in side elevation showing one semi-trailer disconnected from the unit to which it may be coupled.

In Figure 1 a tractor $a$ of conventional type is illustrated having two rear axles $a'$, $a^2$, although a single rear axle might be employed. This tractor carries a suitable fifth wheel element $b$ to which is engaged, by known methods, the semi-trailer $c$, which is to be transported. As shown in Figure 2 the semi-trailer $c$ may have a king pin $c'$ engageable with the fifth wheel plate $b$ on the tractor $a$. The invention is not concerned with the coupling elements and the coupling elements on each semi-trailer may be the same as the coupling elements on the tractor. The semi-trailer $c$ has a rearwardly extending frame member $c^2$ supported on wheels $c^3$ which, as previously pointed out, may be carried on two axles or on one axle, as preferred. While the invention is not limited, in its broadest aspect, to the particular form of each semi-trailer it is thought that that illustrated is advantageous. As shown, the body of the semi-trailer may extend downward to a substantial distance thereby giving greater body capacity interiorly and lowering the center of gravity. This body may be of light construction since the load to be carried therein is not relatively heavy and the body may be mounted on a frame such as illustrated at $c^2$. This frame and the body at the front end may be so formed as not to interfere with the rear end of the frame of the preceding unit such as the tractor frame $a$ and yet extend over the fifth wheel $b$ for engagement therewith.

The next succeeding semi-trailer $d$ may be of the form described with reference to the unit $c$ and be engageable with the fifth wheel member $c^4$ supported on the rearwardly extending frame $c^2$ of the unit $c$. The unit $d$ has a rearwardly extending frame $d'$ supported on wheels $d^2$ and on the frame $d'$ is carried a suitable fifth wheel member $d^3$. The third unit in the train is also a semi-trailer and while it may be of the same form as the units $c, d$, in the preferred embodiment, it is not necessary for it to have a rearwardly extending frame since no additional unit is to be coupled to it. Accordingly, the body $e$ of this last unit may extend for the entire length of the unit being supported by wheels $e'$.

Each of the units illustrated is relatively light in structure because it need carry only a relatively small load say, approximately, one-third of the aggregate load of the train. As the result, the pay-load carried by each unit is relatively great, which is desirable. By the closest coupling of the units as illustrated and described the overall length is not extended unduly. Further, the axle loads which may determine the aggregate load may be a maximum having regard to legal limits. Thus, considering the axles carrying the wheels $c^3$, $d^2$ and $e'$, all of which carry their share of the load the aggregate load may be equal to the maximum legal limit multiplied by the number of axles.

To keep the train as closely coupled as possible and yet retain a short turning radius it is preferred to form the front ends of the several units of curved configuration as indicated at $c^5$, $e^4$ and $e^2$. In this way, each unit may have its front end in close proximity to the rear end of the unit to which it is coupled without interfering with relative turning movements.

For the sake of the disclosure Figure 2 shows the units such as $c$ uncoupled from the preceding unit and supported in any suitable manner as by hinged props $c^6$ with which the invention is not concerned.

The advantages are numerous as compared to conventional practice in which a semi-trailer and full trailer are transported by a single tractor. Draw bars and "dollys" are dispensed with. Better tracking is accomplished than heretofore. Shorter turning radius is secured. Smaller and lighter units permit a relatively greater pay-load. Better braking can be obtained since the braking of the rear wheels of each unit constitutes the equivalent of braking force applied to the front wheels of the next unit. The center of gravity of the load is lowered. With three such lighter units it is possible to transport, while within legal limits, about forty percent (40%) greater aggregate load for a train of given overall length than can be transported in a train of the same length where a semi-trailer and trailer only are used.

The drawings are intended to be conventional in character for the purpose of emphasizing that the invention is not to be limited to details of construction nor shape or size of parts.

What I claim is:

A semi-trailer motor train comprising a tractor, a semi-trailer coupled thereto and having road wheels adjacent its rear end, a fifth wheel element carried by the trailer and disposed over said wheels, a second semi-trailer having a fifth wheel element at its front end engageable with the first named fifth wheel element and road wheels at its rear end, a body on the first semi-trailer extending forwardly from its fifth wheel element, and a body on the second semi-trailer extending over the said fifth wheel elements and terminating in proximity to the body of the first trailer.

This specification signed this 13th day of April A. D., 1931.

CLYDE ERSKINE.